(12) United States Patent
Sun

(10) Patent No.: US 10,602,351 B1
(45) Date of Patent: Mar. 24, 2020

(54) COMMUNICATION INFORMATION HIDING REALIZATION METHOD AND REALIZATION SYSTEM

(71) Applicant: JRD COMMUNICATION INC., Shenzhen, Guangdong (CN)

(72) Inventor: Jipeng Sun, Shenzhen (CN)

(73) Assignee: JRD COMMUNICATION INC., Shenzhen, Guangdong (CN)

(*) Notice: Subject to any disclaimer, the term of this patent is extended or adjusted under 35 U.S.C. 154(b) by 0 days.

(21) Appl. No.: 16/330,386

(22) PCT Filed: Aug. 2, 2017

(86) PCT No.: PCT/CN2017/095711
§ 371 (c)(1),
(2) Date: Mar. 5, 2019

(87) PCT Pub. No.: WO2018/040832
PCT Pub. Date: Mar. 8, 2018

(30) Foreign Application Priority Data

Sep. 5, 2016 (CN) .......................... 2016 1 0801668

(51) Int. Cl.
*H04M 3/42* (2006.01)
*H04W 12/00* (2009.01)
(Continued)

(52) U.S. Cl.
CPC .... *H04W 12/0013* (2019.01); *G06F 16/2379* (2019.01); *H04L 51/16* (2013.01);
(Continued)

(58) Field of Classification Search
CPC ... H04W 12/0013; H04W 4/14; H04W 8/183; H04M 1/72552; H04L 51/16; H04L 51/24; G06F 16/2379
(Continued)

(56) References Cited

U.S. PATENT DOCUMENTS

2012/0314860 A1* 12/2012 Liu .................... H04L 63/0414
380/247

FOREIGN PATENT DOCUMENTS

CN 101668287 A 3/2010
CN 101909114 A 12/2010
(Continued)

*Primary Examiner* — Amancio Gonzalez
(74) *Attorney, Agent, or Firm* — Mark M. Friedman

(57) ABSTRACT

Disclosed are a communication information hiding realization method and realization system. The method comprises: monitoring a communication information database for storing communication information in real time, and judging whether there is newly added communication information in the communication information database; when there is newly added communication information in the communication information database, acquiring a communication number of the newly added communication information, and comparing the communication number to a pre-set communication number set needing to be hidden; and when the communication number exists in the communication number set needing to be hidden, deleting or hiding the communication information corresponding to the communication number in the communication information database. In the present invention, by monitoring a communication information database in real time to judge whether communication information needing to be hidden is automatically deleted or hidden, communication information security is improved.

9 Claims, 1 Drawing Sheet

(51) Int. Cl.
*H04M 1/725* (2006.01)
*H04W 4/14* (2009.01)
*G06F 16/23* (2019.01)
*H04L 12/58* (2006.01)
*H04W 8/18* (2009.01)

(52) U.S. Cl.
CPC ........ *H04L 51/24* (2013.01); *H04M 1/72552* (2013.01); *H04W 4/14* (2013.01); *H04W 8/183* (2013.01)

(58) Field of Classification Search
USPC ....................................................... 455/415
See application file for complete search history.

(56) References Cited

FOREIGN PATENT DOCUMENTS

| | | | | |
|---|---|---|---|---|
| CN | 102118515 | A | 7/2011 | |
| CN | 102238286 | A | 11/2011 | |
| CN | 103002124 | A | 3/2013 | |
| CN | 103916541 | A | 7/2014 | |
| CN | 105162804 | A | 12/2015 | |
| CN | 106412242 | A | 2/2017 | |
| WO | WO-2005050857 | A1 * | 6/2005 | ............ H04M 1/663 |

* cited by examiner

COMMUNICATION INFORMATION HIDING REALIZATION METHOD AND REALIZATION SYSTEM

CROSS REFERENCE TO RELATED APPLICATION

This application claims the priority of International Application No. PCT/CN2017/095711, filed on Aug. 2, 2017, which claims priority to Chinese Application No. 201610801668.5, filed on Sep. 5, 2016. The entire disclosures of each of the above applications are incorporated herein by reference.

TECHNICAL FIELD OF THE INVENTION

The present invention relates to a field of information security technologies, and more particularly to a communication information hiding realization method and a realization system.

BACKGROUND OF THE INVENTION

At present, mobile phone users will receive or make some calls in their daily lives. However, for security reasons, the users do not want to leave traces, so need to manually delete the call records. Moreover, if the user does not receive a call, there will be a system background notification information of the missed call. If the user does not delete the notification, the notification information of the incoming call may not be hidden.

Therefore, the prior art has yet to be improved and developed.

SUMMARY OF THE INVENTION

In view of the foregoing deficiencies of the prior art, an objective of the present invention is to provide a communication information hiding realization method and a realization system, which aims to solve defects that communication record for a specified number needs to be manually deleted and information security is lower in smart terminal according to the prior art.

The technical solution of the present invention is described as follows:

a communication information hiding realization method, including steps of:

A, monitoring a communication information database for storing communication information in real time, and judging whether there is newly added communication information in the communication information database;

B, obtaining a communication number of the newly added communication information when there is the newly added communication information in the communication information database, and comparing the communication number with a pre-set communication number set needing to be hidden; and C, deleting or hiding the communication information corresponding to the communication number in the communication information database when the communication number exists in the communication number set needing to be hidden.

In the communication information hiding realization method, the communication information is phone incoming call information, phone calling information, sent mail, received mail, sent short message service, received short message service, sent WeChat information, received WeChat information, sent QQ information, received QQ information or system background notification information.

In the communication information hiding realization method, Step B includes:

B11, obtaining a phone number corresponding to the phone incoming call information of a phone when there is the newly added communication information in the communication information database and the communication information is the phone incoming call information;

B12, obtaining a country code, an area code and a communication number in the phone number;

B13, comparing the communication number in the phone number with the communication number set needing to be hidden.

In the communication information hiding realization method, Step B includes:

B21, obtaining a phone number corresponding to the system background notification information when there is the newly added communication information in the communication information database and the communication information is the system background notification information;

B22, obtaining a country code, an area code and a communication number in the phone number;

B23, comparing the communication number in the phone number with the communication number set needing to be hidden.

In the communication information hiding realization method, after the country code, the area code and the communication number in the phone number are parsed and obtained, hyphen, blank, or English letter in the phone number is deleted and the phone number is saved.

A communication information hiding realization system, including: a processor; a memory connected with processor, the memory comprising a plurality of program instructions executable by the processor, the plurality of program instructions comprising:

a database monitoring module, monitoring a communication information database for storing communication information in real time, and judging whether there is newly added communication information in the communication information database;

a comparing module, obtaining a communication number of the newly added communication information when there is the newly added communication information in the communication information database, and comparing the communication number with a pre-set communication number set needing to be hidden; and a deleting or hiding module, deleting or hiding the communication information corresponding to the communication number in the communication information database when the communication number exists in the communication number set needing to be hidden.

In the communication information hiding realization system, the communication information is phone incoming call information, phone calling information, sent mail, received mail, sent short message service, received short message service, sent WeChat information, received WeChat information, sent QQ information, received QQ information or system background notification information.

In the communication information hiding realization system, the comparing module includes:

a first phone number obtaining unit, obtaining a phone number corresponding to the phone incoming call information of a phone when there is the newly added communication information in the communication information database and the communication information is the phone incoming call information;

a first code obtaining unit, obtaining a country code, an area code and a communication number in the phone number;

a first matching unit, comparing the communication number in the phone number with the communication number set needing to be hidden.

In the communication information hiding realization system, the comparing module includes:

a second phone number obtaining unit, obtaining a phone number corresponding to the system background notification information when there is the newly added communication information in the communication information database and the communication information is the system background notification information;

a second code obtaining unit, obtaining a country code, an area code and a communication number in the phone number;

a second matching unit, comparing the communication number in the phone number with the communication number set needing to be hidden.

In the communication information hiding realization system, after the country code, the area code and the communication number in the phone number are parsed and obtained, hyphen, blank, or English letter in the phone number is deleted and the phone number is saved.

The present invention provides a communication information hiding realization method and a realization system. The method includes: monitoring a communication information database for storing communication information in real time, and judging whether there is newly added communication information in the communication information database; obtaining a communication number of the newly added communication information when there is the newly added communication information in the communication information database, and comparing the communication number with a pre-set communication number set needing to be hidden; and deleting or hiding the communication information corresponding to the communication number in the communication information database when the communication number exists in the communication number set needing to be hidden. The present invention monitors the communication information database in real time to determine whether the communication information needing to be hidden is automatically deleted or hidden, thereby improving the communication information security of the user.

DETAILED DESCRIPTION OF THE INVENTION

The present invention provides a communication information hiding realization method and a realization system. For making the objectives, technical solutions and effects of the present invention more clear and definite, the present invention will be further described in detail below. It should be noted that the specific embodiments described herein are merely for explaining the present invention and are not intended to limit the present invention.

Figure 1:
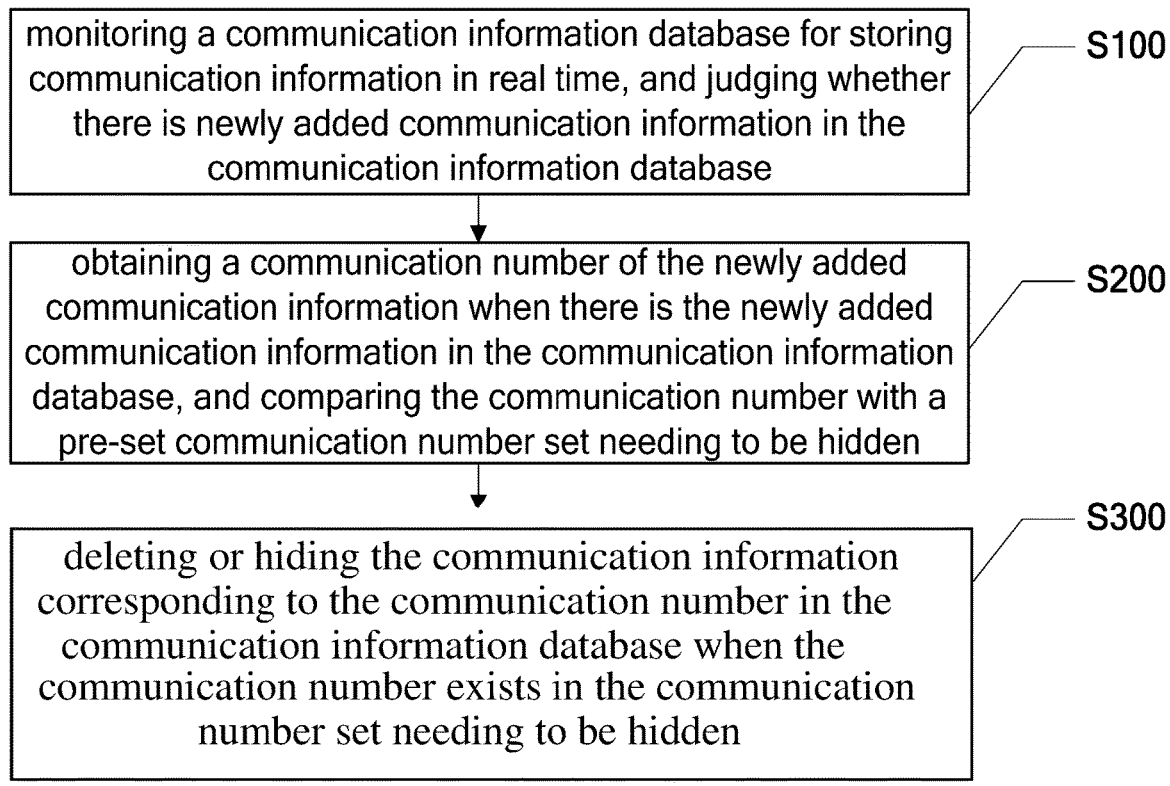
FIG. 1 is a flowchart of a preferred embodiment of a communication information hiding realization method according to the present invention.

As shown in FIG. 1, which is a flowchart of a preferred embodiment of a communication information hiding realization method according to the present invention, the method includes steps of:

Step S100, monitoring a communication information database for storing communication information in real time, and judging whether there is newly added communication information in the communication information database.

In the embodiment of the present invention, the communication information database can extract the communication information of all the communication software installed in the smart terminal in real time, and store the communication information. Therefore, the communication software (such as telephone, SMS, email, WeChat, QQ or Momo) installed in the smart terminal can be stored in the communication information database as long as the communication information is sent or received. Thus, it is only necessary to monitor whether there is newly added communication information in the communication information database, it can be judged whether the smart terminal is in communication state.

Step S200, obtaining a communication number of the newly added communication information when there is the newly added communication information in the communication information database, and comparing the communication number with a pre-set communication number set needing to be hidden.

Since each communication information corresponds to a unique service number (such as a phone number, a QQ number, a WeChat number or an email address), by comparing the communication number (i.e., the service number) corresponding to the communication information with the pre-set communication number set needing to be hidden, it can be judged that the communication number is included in the communication number set needing to be hidden.

Step S300, deleting or hiding the communication information corresponding to the communication number in the communication information database when the communication number exists in the communication number set needing to be hidden.

Apparently, when the communication number exists in the communication number set needing to be hidden, it represents that the communication information corresponding to the communication number needs to be automatically hidden or deleted by a system of the smart terminal to ensure the communication information security.

Preferably, the communication information is phone incoming call information, phone calling information, sent mail, received mail, sent short message service, received short message service, sent WeChat information, received WeChat information, sent QQ information, received QQ information or system background notification information. The system background notification information is background information pushed by Android system or iOS system loaded in smart terminals.

Preferably, as the first specific embodiment, Step S100 specifically includes:

Step S111, obtaining a phone number corresponding to the phone incoming call information of a phone when there is the newly added communication information in the communication information database and the communication information is the phone incoming call information;

Step S112, obtaining a country code, an area code and a communication number in the phone number;

Step S113, comparing the communication number in the phone number with the communication number set needing to be hidden.

In the first specific embodiment, the real-time monitoring of the incoming call information in the smart terminal is illustrated for explanation. Thus, the information security of the incoming call information can be ensured.

Preferably, as the second specific embodiment, Step S100 specifically includes:

Step S121, obtaining the phone number corresponding to the system background notification information when there is the newly added communication information in the communication information database and the communication information is the system background notification information;

Step S122, obtaining a country code, an area code and a communication number in the phone number;

Step S123, comparing the communication number in the phone number with the communication number set needing to be hidden.

In the first specific embodiment, the real-time monitoring of the system background notification information in the smart terminal is illustrated for explanation. Thus, the information security of the system background notification information can be ensured.

Specifically, in Step S112 or Step S121, after the country code, the area code and the communication number in the phone number are parsed and obtained, hyphen, blank, or English letter in the phone number is deleted and the phone number is saved. Namely, when the phone number corresponding to the communication information is obtained, the phone number may include some non-numeric characters such as hyphen, blank or letter. Then, it is required to process the aforesaid characters in the phone number to obtain a standard phone number (the standard phone number generally includes three parts, i.e. country code, area code and communication number), and then the standard phone number is compared with the communication number set needing to be hidden.

When the country code and the area code in the phone number are both empty, and the communication number is non-empty, the communication number in the phone number is compared with the communication number set needing to be hidden; when the country code in the phone number is empty and the area code is non-empty, or the country code in the phone number is non-empty and the area code is empty, or the country code in the phone number is non-empty and the area code when the is non-empty, the non-empty code and number in the phone number are sequentially compared with a plurality of communication numbers included in the communication number set needing to be hidden, so as to accurately judge whether the communication number exists in the communication number set needing to be hidden.

Figure 2:
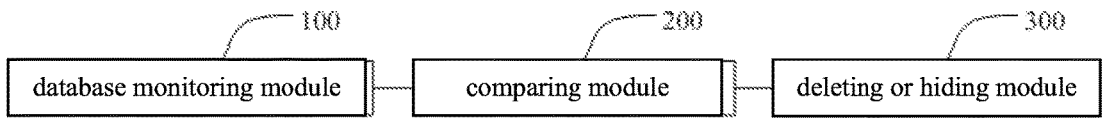
FIG. 2 is a structure block diagram of a preferred embodiment of a communication information hiding realization system according to the present invention.

Based on the foregoing method embodiments, the present invention further provides a communication information hiding realization system. As shown in FIG. 2, the communication information hiding realization system includes: a processor; a memory connected with processor, the memory comprising a plurality of program instructions executable by the processor, the plurality of program instructions comprising:

a database monitoring module 100, monitoring a communication information database for storing communication information in real time, and judging whether there is newly added communication information in the communication information database;

a comparing module 200, obtaining a communication number of the newly added communication information when there is the newly added communication information in the communication information database, and comparing the communication number with a pre-set communication number set needing to be hidden; and a deleting or hiding module 300, deleting or hiding the communication information corresponding to the communication number in the communication information database when the communication number exists in the communication number set needing to be hidden.

Preferably, in the communication information hiding realization system, the communication information is phone incoming call information, phone calling information, sent mail, received mail, sent short message service, received short message service, sent WeChat information, received WeChat information, sent QQ information, received QQ information or system background notification information.

Preferably, in the communication information hiding realization system, the comparing module 200 includes:

a first phone number obtaining unit, obtaining a phone number corresponding to the phone incoming call information of a phone when there is the newly added communication information in the communication information database and the communication information is the phone incoming call information;

a first code obtaining unit, obtaining a country code, an area code and a communication number in the phone number;

a first matching unit, comparing the communication number in the phone number with the communication number set needing to be hidden.

Preferably, in the communication information hiding realization system, the comparing module 200 includes:

a second phone number obtaining unit, obtaining a phone number corresponding to the system background notification information when there is the newly added communication information in the communication information database and the communication information is the system background notification information;

a second code obtaining unit, obtaining a country code, an area code and a communication number in the phone number;

a second matching unit, comparing the communication number in the phone number with the communication number set needing to be hidden.

Preferably, in the communication information hiding realization system, after the country code, the area code and the communication number in the phone number are parsed and obtained, hyphen, blank, or English letter in the phone number is deleted and the phone number is saved.

In conclusion, the present invention provides a communication information hiding realization method and a realization system. The method includes: monitoring a communication information database for storing communication information in real time, and judging whether there is newly added communication information in the communication information database; obtaining a communication number of the newly added communication information when there is the newly added communication information in the communication information database, and comparing the communication number with a pre-set communication number set needing to be hidden; and deleting or hiding the communication information corresponding to the communication number in the communication information database when the communication number exists in the communication number set needing to be hidden. The present invention monitors the communication information database in real time to determine whether the communication information needing to be hidden is automatically deleted or hidden, thereby improving the communication information security of the user.

A person of ordinary skill in the art may understand that all or part of the processes in the aforesaid embodiments may be accomplished by a computer program to instruct related hardware, and the computer program may be stored in a computer readable storage medium, and the program is executed. The flowchart of the embodiment of each of the above methods may be included. The aforesaid storage medium may be a magnetic disk, an optical disk, a read only memory (ROM) or a random access memory (RAM).

It should be understood that the application of the present invention is not limited to the foregoing illustrations, and those skilled in the art can make modifications or changes in accordance with the foregoing description, all of which are within the scope of the appended claims.

What is claimed is:

1. A communication information hiding realization method, including steps of:
    A, monitoring a communication information database for storing communication information in real time, and judging whether there is newly added communication information in the communication information database, wherein the communication information is phone incoming call information, phone calling information, sent mail, received mail, sent short message service, received short message service, sent WeChat information, received WeChat information, sent QQ information, received QQ information or system background notification information;
    B, obtaining a communication number of the newly added communication information when there is the newly added communication information in the communication information database, and comparing the communication number with a pre-set communication number set needing to be hidden, wherein the communication number is included in a phone number; and
    C, deleting or hiding the communication information corresponding to the communication number in the communication information database when the communication number exists in the communication number set needing to be hidden;
    wherein Step B includes:
    B11, obtaining the phone number corresponding to the phone incoming call information of a phone when there is the newly added communication information in the communication information database and the communication information is the phone incoming call information;
    B12, obtaining a country code, an area code and a communication number in the phone number, wherein after the country code, the area code and the communication number in the phone number are parsed and obtained, hyphen, blank, or English letter in the phone number is deleted and the phone number is saved;
    B13, comparing the communication number in the phone number with the communication number set needing to be hidden;
    wherein Step B includes:
    B21, obtaining a phone number corresponding to the system background notification information when there is the newly added communication information in the communication information database and the communication information is the system background notification information;
    B22, obtaining a country code, an area code and a communication number in the phone number, wherein after the country code, the area code and the communication number in the phone number are parsed and obtained, hyphen, blank, or English letter in the phone number is deleted and the phone number is saved;
    B23, comparing the communication number in the phone number with the communication number set needing to be hidden.

2. A communication information hiding realization method, including steps of:
    A, monitoring a communication information database for storing communication information in real time, and judging whether there is newly added communication information in the communication information database;
    B, obtaining a communication number of the newly added communication information when there is the newly added communication information in the communication information database, and comparing the communication number with a pre-set communication number set needing to be hidden, wherein the communication number is included in a phone number; and
    C, deleting or hiding the communication information corresponding to the communication number in the communication information database when the communication number exists in the communication number set needing to be hidden.

3. The communication information hiding realization method according to claim 2, wherein the communication information is phone incoming call information, phone calling information, sent mail, received mail, sent short message service, received short message service, sent WeChat information, received WeChat information, sent QQ information, received QQ information or system background notification information.

4. The communication information hiding realization method according to claim 3, wherein Step B includes:
    B11, obtaining the phone number corresponding to the phone incoming call information of a phone when there is the newly added communication information in the communication information database and the communication information is the phone incoming call information;
    B12, obtaining a country code, an area code and a communication number in the phone number, wherein after the country code, the area code and the communication number in the phone number are parsed and obtained, hyphen, blank, or English letter in the phone number is deleted and the phone number is saved;
    B13, comparing the communication number in the phone number with the communication number set needing to be hidden.

5. The communication information hiding realization method according to claim 3, wherein Step B includes:
    B21, obtaining a phone number corresponding to the system background notification information when there is the newly added communication information in the communication information database and the communication information is the system background notification information;
    B22, obtaining a country code, an area code and a communication number in the phone number, wherein after the country code, the area code and the communication number in the phone number are parsed and obtained, hyphen, blank, or English letter in the phone number is deleted and the phone number is saved;

B23, comparing the communication number in the phone number with the communication number set needing to be hidden.

6. A communication information hiding realization system, including:
    a processor;
    a memory connected with processor, the memory comprising a plurality of program instructions executable by the processor, the plurality of program instructions comprising:
    a database monitoring module, monitoring a communication information database for storing communication information in real time, and judging whether there is newly added communication information in the communication information database;
    a comparing module, obtaining a communication number of the newly added communication information when there is the newly added communication information in the communication information database, and comparing the communication number with a pre-set communication number set needing to be hidden, wherein the communication number is included in a phone number; and
    a deleting or hiding module, deleting or hiding the communication information corresponding to the communication number in the communication information database when the communication number exists in the communication number set needing to be hidden.

7. The communication information hiding realization system according to claim 6, wherein the communication information is phone incoming call information, phone calling information, sent mail, received mail, sent short message service, received short message service, sent WeChat information, received WeChat information, sent QQ information, received QQ information or system background notification information.

8. The communication information hiding realization system according to claim 7, wherein the comparing module includes:
    a first phone number obtaining unit, obtaining a phone number corresponding to the phone incoming call information of a phone when there is the newly added communication information in the communication information database and the communication information is the phone incoming call information;
    a first code obtaining unit, obtaining a country code, an area code and a communication number in the phone number, wherein after the country code, the area code and the communication number in the phone number are parsed and obtained, hyphen, blank, or English letter in the phone number is deleted and the phone number is saved;
    a first matching unit, comparing the communication number in the phone number with the communication number set needing to be hidden.

9. The communication information hiding realization system according to claim 7, wherein the comparing module includes:
    a second phone number obtaining unit, obtaining a phone number corresponding to the system background notification information when there is the newly added communication information in the communication information database and the communication information is the system background notification information;
    a second code obtaining unit, obtaining a country code, an area code and a communication number in the phone number, wherein after the country code, the area code and the communication number in the phone number are parsed and obtained, hyphen, blank, or English letter in the phone number is deleted and the phone number is saved;
    a second matching unit, comparing the communication number in the phone number with the communication number set needing to be hidden.

* * * * *